United States Patent
Bartminn et al.

(10) Patent No.: US 10,622,798 B2
(45) Date of Patent: Apr. 14, 2020

(54) METHOD FOR EXPANDING THE ELECTRICAL TRANSMISSION CAPACITY OF AN OVERHEAD-LINE PYLON SYSTEM

(71) Applicant: INNOGY SE, Essen (DE)

(72) Inventors: Daniel Bartminn, Elmshorn (DE); Friedrich Koch, Kevelaer (DE); Jorn Runge, Marklohe (DE)

(73) Assignee: INNOGY SE, Essen (DE)

( * ) Notice: Subject to any disclaimer, the term of this patent is extended or adjusted under 35 U.S.C. 154(b) by 0 days.

(21) Appl. No.: 16/089,349

(22) PCT Filed: Mar. 29, 2017

(86) PCT No.: PCT/EP2017/057355
§ 371 (c)(1),
(2) Date: Sep. 27, 2018

(87) PCT Pub. No.: WO2017/167776
PCT Pub. Date: Oct. 5, 2017

(65) Prior Publication Data
US 2019/0115740 A1   Apr. 18, 2019

(30) Foreign Application Priority Data

Mar. 29, 2016 (DE) .......... 10 2016 205 118

(51) Int. Cl.
*H01R 43/00* (2006.01)
*H02G 7/20* (2006.01)
(Continued)

(52) U.S. Cl.
CPC .............. *H02G 7/20* (2013.01); *E04H 9/16* (2013.01); *E04H 12/18* (2013.01); *H02G 7/00* (2013.01)

(58) Field of Classification Search
CPC ... H02G 7/00; H02G 7/20; E04H 9/16; E04H 12/18
See application file for complete search history.

(56) References Cited

U.S. PATENT DOCUMENTS

| | | | |
|---|---|---|---|
| 2,036,225 A | 4/1936 | Lusignan | |
| 7,606,017 B2 * | 10/2009 | Rizk | H02G 7/22 174/127 |

(Continued)

FOREIGN PATENT DOCUMENTS

| | | |
|---|---|---|
| DE | 2512764 A1 | 9/1976 |
| DE | 102014001893 A1 | 8/2015 |

(Continued)

OTHER PUBLICATIONS

International Search Report dated Nov. 7, 2017, issued in International Application No. PCT/EP2017/057355, filed Mar. 29, 2017.

(Continued)

*Primary Examiner* — Paul D Kim
(74) *Attorney, Agent, or Firm* — Wiley Rein LLP

(57) ABSTRACT

The invention relates to a method for subsequently expanding the electrical transmission capacity of an overhead-line pylon system as part of an electrical high-voltage network, which comprises at least two overhead-line pylons, wherein the line cables stretched between the overhead-line pylons have a total transmission capacity and a total line cross-section, wherein the method provides for an increase in the total transmission capacity between the overhead-line pylons by recabling and/or an increase in the load-bearing capacity of the overhead-line pylons.

7 Claims, 2 Drawing Sheets

(51) Int. Cl.
*E04H 12/18* (2006.01)
*E04H 9/16* (2006.01)
*H02G 7/00* (2006.01)

(56) References Cited

U.S. PATENT DOCUMENTS

| | | | | |
|---|---|---|---|---|
| 2004/0262022 | A1* | 12/2004 | Shirmohamadi | H02G 7/02 |
| | | | | 174/40 R |
| 2011/0025070 | A1 | 2/2011 | Price | |
| 2011/0185647 | A1 | 8/2011 | Diniz | |
| 2013/0256613 | A1* | 10/2013 | Hyde | H02G 1/02 |
| | | | | 254/134.3 R |

FOREIGN PATENT DOCUMENTS

| | | | |
|---|---|---|---|
| FR | 2063054 | A1 | 2/1971 |
| FR | 2305875 | A1 | 10/1976 |
| JP | 63053502 | A * | 3/1988 |

OTHER PUBLICATIONS

I Albizu et al: "Methods for Increasing the Rating of Overhead Lines", 2005 IEEE Russia Power Tech., Jan. 30, 2005, (Jan. 30, 2005), pp. 1-6.

D.M. Larruskan, et al.: "Power transmission capacity upgrade of overhead lines", Department of Electrical Engineering, E.U.I.T.I., University of the Basque Country, Apr. 4, 2006, (Apr. 4, 2006), pp. 221-227.

Der Bauablauf, et al.: "Freileitungen in Bau", Feb. 28, 2016 (Feb. 28, 2016), retrieved from the Internet: URL: https://www.tennet.eu/fileadmin/user_upload/Our Grid/Onshore_Germany/Allgemein/15-240_Freileitungen_im_Bau-V7_FINAL.pdf [retrieved on Jun. 1, 2017] pp. 1-28.

Puffer, Raif: "Optimierungspotensizel bei Freiletuingen—Was ist machbar?", Institut fur Hochspannungsterchnik, RWTh Aachen, BNetza Technikdialog, Apr. 17, 2012 (2012-94-17), pp. 1-14.

International Preliminary Report on Patentability, dated Jul. 7, 2018, in International Application No. PCT/EP2017/057355, filed on Mar. 29, 2017.

International Search Report With English Translation, dated Jul. 11, 2017, in International Application No. PCT/EP2017/057355, filed on Mar. 29, 2017.

First Written Opinion, in International Application No. PCT/US2017/057355, filed on Mar. 29, 2017.

Second Written Opinion, in International Application No. PCT/US2017/057355, filed on Mar. 29, 2017.

Objections of Third Party received for European Patent Application No. 17714695.8, mailed on Sep. 18, 2019, 8 pages of Official Copy Only.

CTC Global, "Engineering Transmission Lines with High Capacity Low Sag ACCC Conductors", First Edition, 2011, 242 pages.

Grigsby, Leonard L., "Electric Power Generation, Transmission, and Distribution", Chapter 24, The Electric Power Engineering Handbook, Third Edition, CRC Press, 2012, 12 pages.

Leuschner, Udo, "Energie-Chronik", Available on internet <www.udo-leuschner.de/energie-chronik/120810.htm.>, Aug. 2012, 3 pages.

Wikipedia, "ACCC Conductor", Nov. 2013, 6 pages.

* cited by examiner

METHOD FOR EXPANDING THE ELECTRICAL TRANSMISSION CAPACITY OF AN OVERHEAD-LINE PYLON SYSTEM

RELATED APPLICATIONS

This Application is a § 371 National Stage Application of PCT/EP2017/057355, filed Mar. 29, 2017, which claims priority benefit of German Patent Application No. 102016205118.0, filed Mar. 29, 2016, which applications are incorporated entirely by reference herein for all purposes.

FIELD

The present invention relates to a method for expanding the electrical transmission capacity of a power transmission tower system as part of a high-voltage electrical grid.

The present invention relates to a method for retroactively expanding the electrical transmission capacity of an existing power transmission tower system as part of high-voltage electrical grid with the aim of upgrading it.

BACKGROUND ART

Power transmission tower systems are used for transmitting electric power over long distances.

In the context of the present invention, power transmission tower systems are in particular extra-high-voltage and high-voltage transmission tower systems comprising overhead lines which are suspended between them, wherein the overhead lines generally comprise a plurality of conductor cables which are hung between insulators of the power transmission towers.

In electric power supply grids, a distinction is normally made between different voltage levels, i.e., between extra-high voltage, high voltage, medium voltage, and low voltage. The voltages in the individual grid levels are generally adapted to the transport power and the conductor length, so that the transport losses and voltage drops are not too great. Transmission grids are operated at extra-high voltage; distribution grids are generally operated at high voltage. Extra-high voltage refers to voltages between 220 kV and 380 kV, as well as 750 kV and higher; high voltage is generally understood to be a voltage on the order of approximately 110 kV.

Last but not least, it is necessary to continually expand the power grids due to the large proportion of electrical power supplied to the power grids from so-called regenerative energy sources. In addition, this results from the fact that new power plants are being commissioned at new sites, old power plants are being decommissioned, and cross-border electricity trading is increasing in scope.

The necessity of expanding the grid is fundamentally uncontroversial; however, there is increasing public opposition to additional overhead power line towers, in part due to the environmental impact of the magnetic fields induced by the high-voltage electrical grids and the accompanying noise pollution. An alternative option which is contemplated is to lay high-voltage and extra-high-voltage lines underground; however, such undergrounding entails considerable expense and also has a large footprint.

Therefore, there is a fundamental need to be able to transmit more electric power via existing power transmission tower systems.

SUMMARY OF THE INVENTION

The object of the present invention is therefore to provide a method for expanding the electrical transmission capacity of power transmission tower systems, which requires minimal intervention into existing power transmission tower systems.

The object of the present invention is furthermore to provide a correspondingly designed power transmission tower system.

According to the present invention, a method for a minimally invasive grid expansion in existing power transmission tower systems is provided, which achieves an increase in the total transmission capacity of the power transmission tower system via a combination of a variety of measures.

This object is in particular achieved via a method having the features of claim 1. Advantageous embodiments of the method result from the subclaims.

The object forming the basis of the invention is furthermore achieved via a power transmission tower system having the features as described below.

One aspect of the present invention relates to a method for the preferably retroactive expansion of the electrical transmission capacity of a power transmission tower system as part of a high-voltage electrical grid, which comprises at least two power transmission towers and a plurality of conductor cables suspended between them, wherein the conductor cables suspended between the power transmission towers have a total transmission capacity and a total conductor cross section, wherein the method provides for an increase in the total transmission capacity between the power transmission towers by means of one or a plurality of method steps selected from a group comprising the following method steps:

a) suspending at least one additional conductor cable between the power transmission towers, which is insulated with respect to the existing conductor cables, b) suspending at least one additional conductor cable between the power transmission towers, which is in direct electrically conductive contact with an existing conductor cable, c) exchanging at least one conductor cable having a first, smaller conductor cross section, for a conductor cable having a second, larger conductor cross section or having a higher conductivity, d) exchanging at least one conductor cable comprising individual conductors which have a symmetrical cross section, for a conductor cable comprising individual conductors which have an asymmetrical cross section, and e) at least partially changing the arrangement, interconnection, and insulation of the conductor cables of extra-high-voltage or high-voltage alternating-current transmission, to extra-high-voltage or high-voltage direct-current transmission.

In the context of the present invention, references made below to high voltage also include the so-called extra-high voltage between 200 and 1500 kV.

The presently described method may also be used for constructing new conductor systems in existing corridors.

According to feature a) of the method according to the present invention, it is provided that at least one additional conductor cable, preferably a plurality of additional conductor cables, are suspended between existing power transmission towers. This concept assumes that the power transmission towers have additional reserve load-bearing capacity for accommodating additional conductor cables. This results in an increased total conductor cross section. For the case that the reserve load-bearing capacity of the existing power transmission towers is not sufficient, they may be correspondingly strengthened, either by means of structural reinforcement of the transmission tower structure or by reinforcing the foundation.

Alternatively or in addition to feature a), it may be provided that at least one additional conductor cable is suspended between the power transmission towers in such a way that it is in direct electrical contact with an existing conductor cable. In this case, the second conductor cable is advantageously designed to transmit the same current phase as the conductor cable with which it is in direct electrical contact. Therefore, the conductor cross section, and thus the transmission capacity of the relevant conductor cable, or rather, the relevant current phase, is increased.

According to feature c), it is provided that at least one conductor cable having a first, smaller conductor cross section is exchanged for a conductor cable having a second, larger conductor cross section or having a higher conductivity.

According to feature d), at least one conductor cable comprising individual conductors which have a symmetrical cross section may be exchanged for a conductor cable having individual conductors which have an asymmetrical cross section. For example, individual conductors having an asymmetrical cross section, for example, a trapezoidal cross section, may be stranded to form a thicker cross section, so that the relevant conductor cable has a closed surface and an increased cross section. The increased cross section results in particular by avoiding wire gaps between the individual conductors.

Finally, according to feature e), it may be provided that the arrangement, interconnection, and insulation of the conductor cables are to be changed at least partially from extra-high-voltage, high-voltage, or alternating-current transmission, to extra-high-voltage or high-voltage direct-current transmission. Thus, for example, an existing power transmission tower system which is designed for extra-high-voltage or high-voltage alternating-current transmission may be partially recabled from alternating current to direct current, so that the power transmission tower system is designed for alternating current and direct current.

References made in the present invention to extra-high-voltage or high-voltage alternating-current transmission are also to be understood to mean the so-called three-phase transmission of a three-phase alternating current.

According to the present invention, for example, a former power transmission tower for 2×220 kV alternating-current systems on one side may comprise a direct-current system at +/−250 kV. In this case, the insulation coordination for the direct-current system, possibly a with medium-voltage return conductor, must be carried out again; therefore, the insulator length, leakage path, and position must be verified. Mutual electrical and magnetic interference between the systems may, for example, be avoided by using a 50-Hz filter in the direct-current system.

Advantageously, a partial retrofitting of at least two power transmission towers and the conductor cables suspended between them takes place from extra-high-voltage or high-voltage alternating-current transmission, to extra-high-voltage or high-voltage alternating-current transmission, and extra-high-voltage or high-voltage direct-current transmission (hybrid system).

Alternatively or in addition, it is possible to carry out a partial retrofitting of at least two power transmission towers in such a way that conductor cables for different voltage levels are suspended between them. For example, conductor cables for the 110 kV voltage level may be suspended between the power transmission towers at one level, and conductor cables for the 220 kV or 380 kV voltage level may be suspended at another level.

In addition to the use of more highly conductive conductor cables, it is also possible to increase the conductivity of the conductor cables via active cooling or improved passive cooling (for example, via increased air circulation), and thus to increase the total transmission capacity of the cabling provided between the power transmission towers.

Active cooling may, for example, be carried out via heat exchangers provided on the conductor cables, through which a heat exchanger medium, or rather a heat exchanger fluid, flows. The circulation of the heat exchanger medium may, for example, take place via wind power-operated or solar power-operated units arranged on the power transmission towers.

According to the present invention, a structural reinforcement of at least one of the power transmission towers is provided for increasing their load-bearing capacity, so that a corresponding recabling is possible for achieving a larger total conductor cross section. Structural changes in the power transmission towers may, for example, be achieved by means of aerodynamic cladding, which, in conjunction with the existing load-bearing structure, increases the total load bearing capacity of the power transmission towers, in particular against bending, torsional-flexural buckling, axial force, and generally elevated asymmetric loading.

In addition or alternatively, additional guys may be provided within existing power transmission towers, for example, in the form of cables which run along the existing load-bearing structure to the greatest possible extent and absorb tensile forces.

Alternatively or in addition, a structural reinforcement may be provided in the form of a subsequent strengthening of the lattice tower structures of power transmission tower systems, wherein such a strengthening method may comprise laying at least one tube along a support or a cross brace or a diagonal brace of a power transmission tower or along at least a partial length of the support or the cross brace or the diagonal brace, wherein the tube is made up of a tensile stress-resistant material, or has a tensile stress-resistant reinforcement, or encloses a tensile stress-resistant element, or is connected to a tensile stress-resistant element; wherein the method comprises the attachment of the tube and/or the tensile stress-resistant element to a plurality of attachment points of the support or the cross brace or the diagonal brace, said attachment points being spaced apart from one another, and the injection of a curable sealing compound into the tube.

In addition or alternatively, the transmission tower structure or load-bearing structure of a power transmission tower may be provided with a corrosion-inhibiting plating which forms a composite construction with the load-bearing structure of the power transmission tower. Alternatively, load-bearing structures of the power transmission tower may be reinforced with structural membranes made of fiber composite material.

In addition, the method may comprise the strengthening of existing foundations of the power transmission towers.

Alternatively or in addition, an additional transmission tower may be erected between at least two power transmission towers, which supports a portion of the weight of the conductor cables against a subsurface, wherein the support spacing of existing power transmission towers is decreased.

Foundation reinforcements may be carried out, for example, by enlarging the existing individual foundations, by connecting the individual foundations to strip foundations, by integrating the individual foundations into a continuous surface foundation, by providing pile foundations which are introduced via vibration or percussion, by pressure grouting or compressing soil, and by a combination of the aforementioned measures. Alternatively, base reinforcements and strengthening may be carried out, for example, by inserting additional struts and/or guys in the lower area of the tower. In addition or alternatively, corner posts may be embedded in concrete up to a third of the total height, whereby the free cantilever length is increased and the load on the upper load-bearing structure is relieved.

The method according to the present invention is a method for strengthening existing power transmission tower systems.

According to the present invention, furthermore, a power transmission tower system is provided comprising at least two power transmission towers in the form of steel lattice structures having profiles which define a load-bearing structure, wherein insulators are respectively attached to the at least two power transmission towers; and comprising conductor cables which are respectively hung on the insulators and which are suspended between the at least two power transmission towers; comprising means for reinforcing the power transmission towers, which are selected from a group comprising:

A) at least one guy of at least one power transmission tower against a foundation, B) at least one aerodynamic cladding of at least one profile of at least one of the at least two power transmission towers, C) means for reducing the free buckling length of at least one profile in the form of elements which extend parallel to at least one profile of the load-bearing structure and which accommodate tensile forces or compressive forces, D) a structure-reinforcing plating of at least one profile, E) foundation reinforcement of at least one power transmission tower, F) soil compression or soil improvement below and/or in the vicinity of the at least one power transmission tower.

The aforementioned measures are used for strengthening the load-bearing structure with the aim of higher load capacity, and enable a significant increase in the total transmission capacity between the power transmission towers by increasing the total conductor cross section.

According to feature A), at least one of the power transmission towers may be provided with an additional guy against a foundation, and possibly also against an extended foundation. For example, steel cables may be provided as guys.

According to feature B), an aerodynamic cladding may be provided on at least one profile of the load-bearing structure. For example, cladding profiles which have an inflow surface and which form flow shading of a wind-exposed edge of the profile are contemplated as aerodynamic claddings. Such cladding profiles may, for example, form a structural composite along with the profiles of the load-bearing structure; for example, said cladding profiles may be configured as shell-shaped profile segments which are back-foamed with a thermoplastic material.

According to feature C), means are provided for increasing the free buckling length of at least one profile in the form of elements which extend in parallel and to at least one profile of the load-bearing structure and which accommodate tensile forces or compressive forces. These may, for example, be rods or cables which, for example, are tensioned parallel to profiles of the load-bearing structure. Alternatively, tubes injected with a sealing compound or the like may be provided therefor, as already described above.

Thus, according to feature D), a structure-reinforcing plating of at least one profile may be provided.

According to features E) and F), means for increasing the load-bearing capacity of the foundation are provided, for example, via additional in-situ surface foundations or deep foundations.

In one advantageous variant of the power transmission tower system according to the present invention, at least one preferably telescopic additional tower is provided, which is arranged within the lattice structure of at least one power transmission tower, and which diverts compressive forces from upper portions of the lattice tower structure, and which thereby increases the total load-bearing capacity of the power transmission tower system. The support spacing of the conductor cables is thereby decreased.

Means may be provided for providing or generating electrical energy at at least one of the power transmission towers, for example, PV cells, batteries, or small wind turbines, which feed in or store energy and provide the energy for active cooling, i.e., which support systems for cooling and for sensor monitoring of the conductor cables.

Generally, it may be provided to equip the power transmission tower system according to the present invention with larger insulators which enable the installation of the conductor cables having a greater spacing from one another and from the load-bearing structure.

BRIEF DESCRIPTION OF THE DRAWINGS

An exemplary embodiment of the present invention will be described below, based on the drawings depicted in the figures.

The following are shown.

DETAILED DESCRIPTION OF THE EMBODIMENTS

Figure 1:
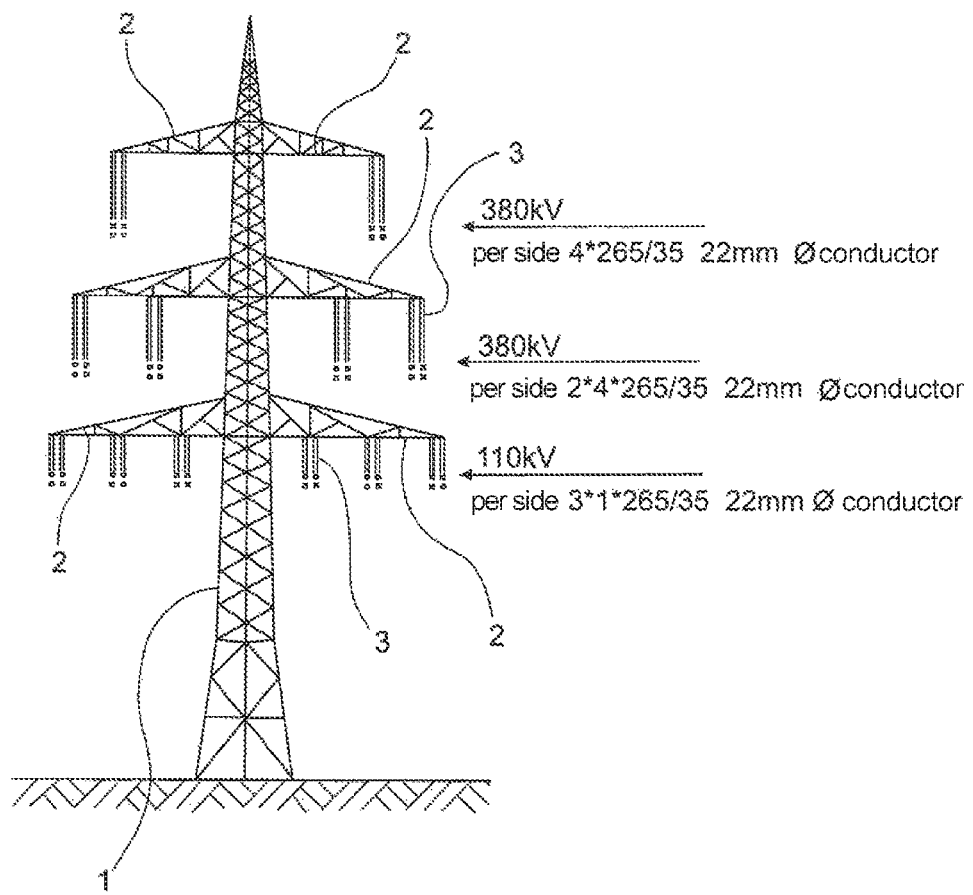
FIG. 1 shows a depiction of a power transmission tower which carries conductor cables for different voltage levels and which has been recabled to a larger total conductor cross section.

The power transmission tower 1 depicted in FIG. 1 is configured as a conventional open steel lattice structure. The power transmission tower 1 comprises a plurality of crossarms 2 which respectively accommodate insulators 3 on which conductor cables, which are not depicted, are hung. The crossarms 2 arranged at the bottom in the figures accommodate conductor cables at the 110 kV voltage level; the crossarms 2 arranged above them accommodate conductor cables at the 380 kV voltage level.

In the configuration shown in FIG. 1, in the case of the upper crossarms 2, it is provided to accommodate each side with four conductor cables of the type 265/35, each having a diameter of 22 mm. Each of the conductor cables may be configured as a steel-aluminum composite cable having a 265-mm2 cross section. Such a conductor cable may, for example, comprise a steel core made up of seven single wires and 24 aluminum wires in two layers, which are twisted in opposite directions for reasons of stability.

The central crossarms 2 in the example according to FIG. 1 can accommodate four conductor cables of type 265/35 per side. The crossarms 2 arranged below them are configured to accommodate three conductor cables of type 265/35 per side.

Figure 2:
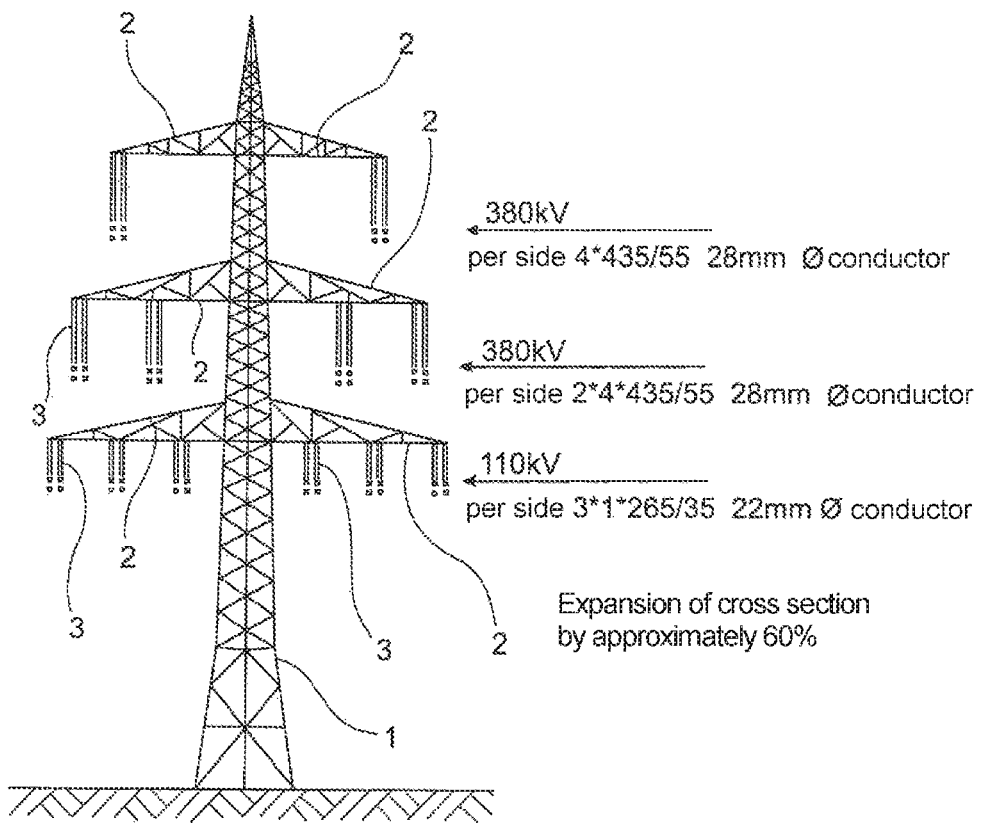
FIG. 2 shows a power transmission tower corresponding to FIG. 1, which accommodates conductor cables for different voltage levels and has a total conductor cross section which is increased by 60% with respect to the situation illustrated in FIG. 1.

The configuration according to FIG. 2 differs from the one according to FIG. 1 only in that the upper and central crossarms 2 respectively comprise conductor cables of type 435/55, which respectively have a diameter of 28 mm and which respectively have a cross-section area of 435 mm2. This means a cross-section expansion of approximately 60% with respect to the exemplary embodiment according to FIG. 1.

LIST OF REFERENCE CHARACTERS

1 Power transmission tower
2 Crossarm
3 Insulators

The invention claimed is:

1. A method for retroactively expanding the electrical transmission capacity of a power transmission tower system as part of a high-voltage electrical grid, which comprises at least two power transmission towers (1) and a plurality of conductor cables suspended between them, wherein the conductor cables suspended between the power transmission towers (1) have a total transmission capacity and a total conductor cross section, and wherein the power flow of at least one conductor cable is regulated in terms of an optimization to a higher transmission capacity, as a function of a temperature of a relevant conductor cable, the method comprising at least one or more steps of:
   suspending at least one additional conductor cable between the power transmission towers (1), which is insulated with respect to the existing conductor cables;
   suspending at least one additional conductor cable between the power transmission towers (1), which is in direct electrically conductive contact with an existing conductor cable exchanging at least one conductor cable having a first, smaller conductor cross section, for a conductor cable having a second, larger conductor cross section or having a higher conductivity;
   exchanging at least one conductor cable comprising individual conductors which have a symmetrical cross section, for a conductor cable comprising individual conductors which have an asymmetrical cross section; and
   at least partially changing the arrangement, interconnection, and insulation of the conductor cables of extra-high-voltage or high-voltage alternating-current transmission, to extra-high-voltage or high-voltage direct-current transmission.

2. The method as claimed in claim 1, further comprising partial retrofitting the at least two power transmission towers (1) and the conductor cables suspended between them, from extra-high-voltage or high-voltage alternating-current transmission, to extra-high-voltage or high-voltage alternating-current transmission, and extra-high-voltage or high-voltage direct-current transmission.

3. The method as claimed in claim 1, further comprising partial retrofitting the at least two power transmission towers (1) in such a way that conductor cables for different voltage levels are suspended between them.

4. The method as claimed in claim 1, characterized in that at least one conductor cable is actively cooled for increasing the conductivity.

5. The method as claimed in claim 1, further comprising: providing a structural reinforcement of at least one of the power transmission towers (1).

6. The method as claimed in claim 1, further comprising: providing a foundation reinforcement of at least one of the power transmission towers (1).

7. The method as claimed in claim 1, characterized in that an additional tower is erected between the at least two power transmission towers (1), which supports a portion of a weight of the conductor cables, whereby a support spacing of the at least two power transmission towers (1) is decreased.

* * * * *